United States Patent Office 3,123,483
Patented Mar. 3, 1964

3,123,483
EDIBLE COLLAGEN CASING AND METHOD
OF PREPARING SAME
James T. McKnight, Somerville, N.J., assignor to Johnson & Johnson, a corporation of New Jersey
No Drawing. Filed Oct. 9, 1961, Ser. No. 143,564
7 Claims. (Cl. 99—176)

This invention relates to an improved collagen tube containing sodium carboxymethyl cellulose, also known as carboxymethyl cellulose, CMC, cellulose gum and cellulose glycolate, and to a method of applying carboxymethyl cellulose to collagen tubes.

The product of the invention is particularly adapted to be utilized as an edible casing for fresh pork sausages which must be cooked by the consumer, and sausages of the wiener or frankfurter type. The latter sausages are generally processed by being smoked and cooked by the packer and are generally reheated before they are consumed. When such sausages are provided with edible casings, it is unnecessary to remove the casing before the sausage is eaten.

Natural casings, i.e., those prepared from the intestines of animals such as cattle, swine and sheep, suffer from a number of disadvantages which limit their acceptance. While sheep casings command a high price because of the fact that they are exceptionally tender and may be readily eaten with the sausage, cleaned intestines, in spite of processing, are frequently tough and unpleasant to eat. In addition, the thickness of the wall and diameter of natural casing will vary, causing difficulty during modern high speed stuffing.

In view of the obvious deficiencies of natural casings and the expense of preparing such casings for human consumption, it is not surprising that many attempts have been made to prepare a better edible casing from other sources of collagen.

It has already been proposed to produce an artificial collagen casing from fibrous animal material, such as, for example, hide. The collagen in such fibrous material is converted by mechanical disintegration and the swelling action of acids into a plastic mass which is then extruded to form a tube. It has been found necessary, in order to obtain the mechanical strength required of the extruded casing in use, to include a tanning step in the manufacturing process. However, the tanned collagen casings so prepared have high shrink tension when heated and contract to a fraction of their original size. Such casings, when stuffed with edible meat product, will not survive in the frying pan because cooking temperatures cause the collagen casing to shrink, thus extruding the meat product.

It has now been discovered that when the collagen casing is treated with the sodium salt of carboxymethyl cellulose, which hereafter will be referred to by its more common name "carboxymethyl cellulose," the tanning process may be much less drastic so that the stuffed casing will survive the frying operation. An additional advantage of treating the collagen casing with carboxymethyl cellulose is that the burst strength of the casing is thereby increased.

It is an object of the present invention to produce a new and improved seamless collagen casing that when filled with an edible meat product, will survive without breaking or undue shrinkage, when fried.

Another object of this invention is to treat with carboxymethyl cellulose a continuous extruded collagen tube and thereby increase the dry burst strength of the extruded product.

Another object of this invention is to increase the wet tensile strength and the hot tensile strength of a continuous extruded collagen tube so that the tube may be processed without breakage particularly during drying.

When the carboxymethyl cellulose is added to any of the processing baths, there will be some migration of carboxymethyl cellulose into the wall of the collagen tube. It will be understood, therefore, that the carboxymethyl cellulose to a greater or lesser extent may be present throughout the entire wall of the collagen casing and that the present invention is not limited to a surface or layer effect.

It is most convenient to add the carboxymethyl cellulose to the plasticizing bath which may contain an aqueous solution of glycerine or a simple solution of carboxymethyl cellulose may be used to treat the surface of the casing.

The carboxymethyl cellulose may be applied to either the interior surface or the exterior surface of the casing wall with equivalent results. However, the applicant prefers to apply the carboxymethyl cellulose to the exterior surface of the casing because the application of carboxymethyl cellulose to the internal surface of a continuously extruded casing involves obvious mechanical difficulties.

The amount of carboxymethyl cellulose present in and on the finished casing may vary widely, depending upon the distribution of the carboxymethyl cellulose throughout the casing and the proportion of the total carboxymethyl cellulose that is present at the surface. In general, however, from about 0.5 to 3.0% carboxymethyl cellulose based upon the total weight of the collagen casing as used prior to stuffing (casing equilibrated at relative humidity of about 50%) makes a noticeable improvement in the behavior of the casing during frying. To obtain this amount of carboxymethyl cellulose in and on the casing, the carboxymethyl cellulose may be applied to the wet casing as an 0.02 to 3.0% solution or carboxymethyl cellulose may be added to one of the processing baths, e.g., the plasticizing bath, to give a solution of similar concentration. If the concentration of carboxymethyl cellulose in solution is in the range of from about 0.02% to about 1.0%, the contact time of the casing should be about 10 minutes. This time may be reduced for a more concentrated solution. If the carboxymethyl cellulose is applied in the plasticizing bath, the ratio of carboxymethyl cellulose to glycerol may be varied widely, i.e., from about 1:150 to about 1:1. If the carboxymethyl cellulose is being applied to a dried casing, a 15% solution of carboxymethyl cellulose can be used and the ratio of carboxymethyl cellulose to glycerol may be about 3:2. At the higher concentrations of carboxymethyl cellulose, however, the solutions are very difficult to pump and the plasticization and subsequent drying treatment are mechanically difficult.

It will be understood that carboxymethyl cellulose may be obtained from commercial manufacturers in various substitution ranges and viscosities. Carboxymethyl cellulose having a substitution in the range of 0.65 to 0.85 and of low, medium or high viscosity is preferred in the practice of the present invention. However, carboxymethyl cellulose of low, medium or high viscosity and having a substitution range from about 0.40 to about 1.20 may be used to advantage.

In order that those skilled in the art may better understand how the present invention may be carried out, the following examples are given by way of illustration and not by way of limitation. Throughout the specification and examples, all quantities are expressed in parts by weight unless otherwise indicated.

For purposes of comparison, Examples I, III and V illustrate the preparation of collagen tubes which do not embody the invention, while Examples II, IV and VI are respectively the same except for the inclusion of treatment with carboxymethyl cellulose in accordance with the invention.

EXAMPLE I

Fresh steer hides are washed with cold water at 60° C. or less in a rotating drum for 10 to 24 hours. After washing, the hides are defleshed with a scraping machine and the hair and epidermis are cut off with a horizontal band knife. This preliminary cleaning is accomplished with standard tannery equipment.

The remaining hair and poorly cleaned sections are cut off by hand and composites prepared from five hides. The hide composites are then cut into ½ to 4 square inch sections and reduced to pulp by three passes through a meat grinder, each pass being a finer grind. The first and second passes are through 18 and 8 millimeter holes respectively. The final grind is through holes 1.5 millimeters in diameter. It is important during the grinding process to keep the pulp below 20° C. This may be done by adding crushed ice to the hides as they are fed to the grinder.

The ground pulp is next diluted with tap water at 16° C. to give a smooth slurry containing 7.0% dry solids. This slurry (125 parts) is then treated with 125 parts of a 2.4% lactic acid solution using an inline mixer to form a homogeneous mass of swollen collagen fibrils. It is important during this acid swelling step that the temperature be maintained below about 25° C. The mixture so obtained contains 3.5% hide solids and 1.2% lactic acid. After the pulp is blended with acid, the mass of swollen collagen fibrils is further dispersed in a suitable homogenizer such as a Manton-Gaulin homogenizer (Model 125-K-5BS), fitted with a 2-stage valve and operated with a 1500 p.s.i. drop per stage.

The swollen collagen mass so obtained is filtered through a 7-mil filter screen and extruded in the form of a seamless tube in such a way as to impart some collagen fibril orientation transverse to the extrusion direction. This may be partially accomplished by inflating the casing as it leaves the nozzle.

This extruded collagen tube of swollen collagen fibrils is coagulated for 6 minutes in an aqueous ammonium sulfate bath containing 40% ammonium sulfate adjusted to a pH of 7.0 with ammonium hydroxide and is then pre-washed with 15% ammonium sulfate similarly adjusted to pH 7.5 for an equal period of time.

Alum tanning of this extruded casing is accomplished by treatment with an alum solution containing 6% alum $[NH_4Al(SO_4)_2 \cdot 12H_2O]$, 1.0% citric acid and 2.5% ammonium sulfate. The contact time is 6 minutes and this alum tanning solution is maintained at pH 4.3. After the tanning step, the casing is washed in tap water for 14 minutes using two changes of water. The casing is finally plasticized by passing it through a bath containing 4.1% glycerol. The dwell time in this bath is 4 minutes. The casing is inflated and dried for 10 minutes in a rapid stream of warm air and heat cured in a forced draft oven for 24 hours at 80° C. over phosphorus pentoxide.

The wall thickness of the casing so obtained is 1 mil. The burst strength is 26 pounds per square inch and the hot tensile strength is 26 pounds per square inch and the hot tensile strength is 0.13 pound. The hot tensile strength is determined by measuring the force required to break a 3-inch section of casing heated to about 99° C., with wet steam. The breaking force is applied in a direction parallel to the longitudinal axis of the collagen casing.

EXAMPLE II

A collagen casing is prepared exactly as described in Example I above, except that 0.33% carboxymethyl cellulose is added to the plasticizing bath and the glycerol concentration is increased from 4.1% to 4.8%. The carboxymethyl cellulose used has a viscosity of 25–50 centipoises, in 2% aqueous solution at 25° C., as determined by a Brookfield viscosimeter and the degree of substitution is 0.75. This product is stated to have about one-quarter of the three available anyhydroglucose units substituted with carboxymethyl groups. The dwell time of the casing in the plasticizing bath is 4 minutes during which time some of the carboxymethyl cellulose in the plasticizing bath penetrates into the collagen fibrils that are remote from the surface of the casing. After the casing has been plasticized, it is inflated and dried for 10 minutes in a rapid stream of air. The product is then heat cured for 24 hours at 80° C. in a forced draft oven over phosphorus pentoxide.

The wall thickness of the casing so obtained is 1.0 mil, the burst strength is 30 pounds per square inch and the hot tensile strength is 0.21 pound per square inch. This product may be shirred, stuffed and linked without difficulty and the cooking response of the edible sausage so obtained is good. If desired, the casing may be inverted before stuffing so that the carboxymethyl cellulose coating is in contact with the meat product.

EXAMPLE III

An air-dried collagen casing is prepared exactly as described in Example I above, except that the plasticizing bath contains 3.6% glycerol instead of 4.1% glycerol. The plasticized casing is air-dried at room temperature, cut into 6-foot lengths and heat-cured for 24 hours at 80° C. over phosphorus pentoxide in a forced draft oven.

This casing has a wall thickness of 1.0 mil, a burst strength of 29 pounds per square inch and a hot tensile strength of 0.09 pound.

EXAMPLE IV

An air-dried casing is prepared exactly as described in Example III above, except that 0.33% low viscosity carboxymethyl cellulose is added to the plasticizing bath and the glycerol concentration is increased from 3.6% to 4.8%. The casing is air-dried at room temperature, cut into 6-foot lengths, inflated and heat cured in a forced draft oven for 24 hours over phosphorus pentoxide.

The wall thickness of this casing is 1.0 mil, the burst strength is 34 pounds per square inch, and the hot tensile strength is 0.22 pound. The casing may be shirred, stuffed and linked without difficulty and cooks satisfactorily without undue shrinkage.

EXAMPLE V

A homogeneous mass of swollen collagen fibrils (4% hide solids and 1.2% lactic acid) prepared as described in Example I above, is filtered through a 7-mil filter screen and extruded in the form of a tube. This extruded tube of swollen collagen fibrils is coagulated for six minutes in an aqueous ammonium sulfate bath containing 40% ammonium sulfate adjusted to a pH of 7.0 with ammonium hydroxide and is then pre-washed for an equal period of time in 15% ammonium sulfate similarly adjusted to pH of 6.5.

Alum tanning of this extruded casing is accomplished by treatment with an alum solution containing 3% alum $[NH_4Al(SO_4)_2 \cdot 12H_2O]$, 0.5% citric acid and 10% ammonium sulfate. The contact time is 6 minutes and this alum tanning solution is maintained at pH 4.3. After the tanning step, the casing is washed in tap water for 14 minutes using two changes of water. The casing is finally plasticized by passing it through a bath containing 3.6% glycerol. The dwell time in this plasticizing bath is 5 minutes. The plasticized casing is inflated and dried for 9 minutes in a rapid stream of air at 80° C. and 8% relative humidity and is then heat cured in a forced draft oven at 72° C. and 27% relative humidity for 24 hours.

This casing has a wall thickness of 1.0 mil and a burst strength of 18 pounds per square inch. This product stuffed and linked satisfactorily, but gave excessive shrinkage when cooked.

EXAMPLE VI

A collagen casing is prepared exactly as described above in Example V, except that 0.3% low viscosity carboxymethyl cellulose and 5% albumin are added to the plasticizing bath and the glycerol concentration is increased from 3.6% to 6.0%. The dwell time of the casing in this bath is 5 minutes. The casing is then rinsed for one minute, by passing it through a water bath. After the casing has been washed, it is inflated and dried at 80° C. and 8% relative humidity for 9 minutes. The washed casing is then heat-cured in a forced draft oven at 72° C. and 27% relative humidity for 24 hours.

This casing has a wall thickness of 1.0 mil and a burst strength of 22 pounds per square inch. This product stuffed and linked satisfactorily and cooked satisfactorily without excessive shrinkage.

EXAMPLE VII

Collagen casings are prepared as described in Example V from a swollen mass of colalgen fibrils containing hardwood cellulose fibers. The homogeneous mass extruded consists of 3.8% hide solids, 0.8% hardwood cellulose fibers and 1.2% lactic acid. The casing, after the tanning step described in Example V, is passed through a plasticizing bath containing 3% glycerol and varying quantities of carboxymethyl cellulose. The plasticized casing is then inflated, and dried for 9 minutes in a rapid stream of air at 80° C. and 8% relative humidity, then heat cured in a forced draft oven at 80° C. for 24 hours. The effect of varying the type and amount of carboxymethyl cellulose is illustrated in the following table:

Table I

| Plasticizer | Wet Tensile Strength, gms. | Hot Tensile Strength, lb. | Remarks |
| --- | --- | --- | --- |
| 3% Glycerol | 460 | 0.691 | Control sample. Cooking response acceptable. Tendency to shrink. |
| 3% Glycerol, 0.1% CMC, Low Visc. | 470 | 0.751 | Good cooking response. Less shrinkage. |
| 3% Glycerol, 1% CMC, Low Visc. | 500 | 0.752 | Acceptable cooking response. Tendency to melt, still less shrinkage. |
| 3% Glycerol, 2.5% CMC, Low Visc. | 670 | 0.806 | Excellent cooking response. Difficult to inflate. |
| 3% Glycerol, 0.02% CMC, High Visc. | 430 | 0.678 | Good cooking response. |
| 3% Glycerol, 0.1% CMC, High Visc. | 460 | 0.688 | Excellent cooking response. |
| 3% Glycerol, 0.25% CMC, High Visc. | 440 | 0.658 | Fair cooking response. Melting. |
| 3% Glycerol, 0.5% CMC, High Visc. | 550 | 0.881 | Less desirable cooking response. Too much melting. Difficult to inflate. |

The low viscosity carboxymethyl cellulose used in this Example is that described above in Example II. The high viscosity carboxymethyl cellulose used in this example has a viscosity of 1300 to 2200 centipoises in 1% aqueous solution at 25° C., as determined by a Brookfield viscosimeter and the range of substitution is 0.65 to 0.85. It will be observed that the best cooking response is obtained when the high viscosity carboxymethyl cellulose is present in the plasticizing bath at lower concentration (about 0.02 to about 0.1%).

The present application is a continuation-in-part of my copending application Serial No. 64,310, filed October 24, 1960, now abandoned.

The invention may be embodied in other forms without departing from the spirit or essential characteristics thereof as set forth in the claims, and the present embodiment is, therefore, to be considered as illustrative and not restrictive and it is intended to include all changes which come within the scope and range of the claims.

What is claimed is:

1. An edible extruded collagen casing comprising collagen fibrils, said casing containing carboxymethyl cellulose.

2. The collagen casing of claim 1 in a shirred condition.

3. An edible extruded collagen casing comprising collagen fibrils, said casing having a surface coating of carboxymethyl cellulose.

4. As an article of manufacture, an edible collagen casing of uniform diameter for sausages, said casing comprising a seamless tube of collagen fibrils, said tube being characterized by the presence of carboxymethyl cellulose and albumin.

5. As an article of manufacture, an edible collagen casing of uniform diameter for sausages, said casing comprising a seamless tube of collagen fibrils, said tube being characterized by a surface coating of carboxymethyl cellulose which penetrates beyond the surface of the wall of the tube.

6. A method of improving the cooking characteristics of an edible collagen casing formed of a tubing extruded from a mass of swollen collagen fibrils which comprises immersing said tubing in a solution of carboxymethyl cellulose.

7. A method of improving the cooking characteristics of an edible collagen casing formed of a tubing extruded from a mass of swollen collagen fibrils which comprises treating at least one surface of the casing with albumin and carboxymethyl cellulose.

References Cited in the file of this patent

UNITED STATES PATENTS

| 1,616,971 | Henderson | Feb. 8, 1927 |
| 2,586,945 | Harrel et al. | Feb. 26, 1952 |
| 2,988,451 | Zahn | June 13, 1961 |
| 3,071,477 | Klevens | Jan. 1, 1963 |

FOREIGN PATENTS

| 350,758 | Great Britain | June 18, 1931 |